Patented Jan. 9, 1951

2,537,635

UNITED STATES PATENT OFFICE 2,537,635

BUTADIENE-STYRENE COPOLYMERS STABILIZED WITH TERTIARY ALKYL NAPHTHOLS

Harry E. Albert, Akron, Ohio, assignor to The Firestone Tire & Rubber Company, Akron, Ohio, a corporation of Ohio No Drawing. Application January 17, 1950, Serial No. 139,112

16 Claims. (Cl. 260—45.95)

This invention relates to the stabilization of rubber-like copolymers of a conjugated diene and and a vinyl aromatic compound, such as butadiene and styrene, whether cured or uncured. More particularly, the invention relates to the stabilization of such copolymers with tertiary-alkyl beta-naphthols, and more particularly tertiary-butyl and tertiary-octyl-beta-naphthols.

Many rubber antioxidants have been found to stabilize the rubber-like copolymers of butadiene and styrene, but such stabilization is usually accompanied by discoloration of the copolymer. Beta-naphthol, for instance, which has been used as a stopping agent in the copolymerization reaction mixtures, apparently has a stabilizing effect on the copolymers, but when used in compositions pigmented with white pigments for the preparation of compositions for white side-wall tires, for example, discolors the pigmented composition badly. Furthermore, it is too volatile to have a permanent effect, and it has appreciable water solubility. The alkylated naphthols are less volatile and less water soluble and do not discolor, or discolor but slightly.

The substitution of the one or more tertiary-alkyl substituents in the nucleus apparently affects the compound so as to retard or stop discoloration. In general, a single tertiary-alkyl substituent is more satisfactory than more than one substituent, and the tertiary-alkyl beta-naphthols are more satisfactory than the tertiary-alkyl alpha-naphthols. Monoalkylation probably introduces substituents into the 1 or 4 position of beta-naphthol. The invention includes the use of polytertiary alkylated beta naphthols as well as the mono- and di-tertiary-alkylated naphthols which are generally preferred. The alkyl substituent or substituents may contain one up to ten carbon atoms. Representative compounds include, for example:

Tertiary-octyl-beta-naphthol
Tertiary-butyl-beta-naphthol
Di-tertiary-butyl-beta-naphthol
Tertiary-octyl, methyl-beta-naphthol
Di-tertiary-butyl, methyl-beta-naphthol The invention is not limited to tertiary-butyl and tertiary-octyl beta-naphthols, but includes beta naphthols containing other tertiary substituents, such as pentyl, hexyl, heptyl, nonyl and decyl.

The following examples illustrate the preparation of the alkylated naphthols.

EXAMPLE 1

*Tertiary-octyl-beta-naphthol*

Diisobutylene is caused to react with beta-naphthol in equimolecular proportions in the presence of 94 per cent sulfuric acid. (The reaction is described in Hester U. S. 2,098,017.) Purification is effected by extraction with alkali followed by distillation and recrystallization from gasoline or by recrystallization alone. Tertiary-octyl-beta-naphthol was obtained as a white crystalline material, the melting point being about 126–127.5° C., uncorrected.

EXAMPLE 2

*Tertiary-butyl-beta-naphthol*

Equimolecular proportions of tertiary-butyl chloride and beta-naphthol were reacted in the presence of zinc chloride at 45–50° C. for 18 hours. Dry gasoline was used as the solvent. The product was purified by alkali extraction and recrystallization from gasoline. Tertiary-butyl-beta-naphthol was thus obtained as a white crystalline material with a melting point of 117–118° C., uncorrected.

EXAMPLE 3

*Di-tertiary-butyl-beta-naphthol*

Two mols of tertiary-butyl chloride and one mol of beta-naphthol were reacted in the presence of zinc chloride until the evolution of hydrogen chloride virtually stopped. Then aluminum chloride was added to complete the reaction. The product was purified by water extraction, alkali extraction, and recrystallization from gasoline. Di-tertiary-butyl-beta-naphthol was obtained as white crystals melting at 132.5 to 133° C., uncorrected.

The tertiary-alkyl beta-naphthols used in the following experiments were prepared as above described and had the melting points referred to. They were added to the latex of rubber-like copolymer of butadiene and styrene known as GR-S, and the products were tested for discoloration and to determine whether the alkylated beta-naphthols retarded oxidation and polymerization at the elevated temperatures employed. In recording the tests, the discoloration is first noted and then the properties of the product with respect to whether or not the heating caused the polymer to stiffen or whether the presence of the alkylated naphthol prevented further polymerization and oxidation.

The following table records the results of drying and aging uncured copolymer, as indicated:

TABLE I
*GR-S copolymer aging*

| Antioxidant | After Drying 20 Hours at 75° C. | | Heat-Aging at 110° C. | | | |
| --- | --- | --- | --- | --- | --- | --- |
| | | | One Day | | Two Days | |
| | Color | Hand Test | Color | Hand Test | Color | Hand Test |
| Tertiary-octyl-beta-naphthol | Light gray-brown | No deterioration | Light gray-brown | No change | Medium brown | No change. |
| Tertiary-butyl-beta-naphthol | do | do | do | do | do | Do. |
| Di-tertiary-butyl-beta-naphthol | Light brown | do | Light brown | do | Brown | Somewhat set up. |
| Control | Dark gray | do | Dark gray-brown | do | Dark brown | Do. |

The stabilizer used as the control is a most widely accepted nondiscoloring antioxidant for butadiene-styrene copolymers at the present time and is identified below as stabilizer No. 1. It is a mixed heptylated diphenylamine. It will be noted from the table that the tertiary-octyl and tertiary-butyl-beta-naphthols are about equal from the standpoint of aging and are superior to the control. The ditertiary-butyl-beta-naphthol is equal to the control. From the standpoint of copolymer discoloration, all three materials were better than the control after drying and after heat-aging. The tertiary-octyl and tertiary-butyl-beta-naphthols gave the best results.

GR-S copolymer stabilized with the antioxidants (added previously to the latex) was used in making up typical white side-wall tire stocks according to the following formula:

| | Parts by weight |
| --- | --- |
| Copolymer containing 2% antioxidant | 100.0 |
| Coumarone | 10.0 |
| Accelerator | 1.1 |
| Magnesium oxide | 8.0 |
| Sunproof wax | 2.0 |
| Zinc oxide | 100.0 |
| Ultramarine blue | 0.1 |
| Titanium oxide | 30.0 |
| Sulfur | 4.0 |

The sunproof wax is wax of the type usually compounded in such a formula to produce a slight bloom on the cured product.

To show that the antioxidant has not deleterious effect on the physical properties of the rubber, the average of tests conducted on stocks cured, 30, 50, and 70 minutes at 300° F. are given below together with results of tests similarly conducted on a control containing a commercial stabilizer identified as stabilizer No. 1:

TABLE II
*Properties of GR-S vulcanizate*

| | Tertiary-Octyl-Beta-Naphthol | Control |
| --- | --- | --- |
| 300% Modulus: | | |
| Normal | 367 | 375 |
| Aged | 875 | 867 |
| Per Cent of Original | 238 | 231 |
| Tensile: | | |
| Normal | 1,525 | 1,250 |
| Aged | 1,808 | 1,392 |
| Per Cent of Original | 118.5 | 111.5 |
| Elongation: | | |
| Normal | 517 | 450 |
| Aged | 425 | 378 |
| Per Cent of Original | 82.2 | 84.0 |

The aged samples of GR-S referred to in the above table were oven-aged four days at 212° F.

Exposure tests were conducted on various white vulcanizates prepared according to the above formula. The results of the tests are given below. In each case samples cured 30, 50, and 70 minutes at 300° F. were exposed. The artificial exposure tests were conducted in a fadeometer at 125° F. The sun-lamp tests were conducted with a General Electric lamp at a distance of 7 inches. The control contained stabilizer No. 1.

TABLE III
*Exposure tests on GR-S vulcanizate*

| Antioxidant | Artificial Tests | | Sunlight Tests | |
| --- | --- | --- | --- | --- |
| | Five Hours | Ten Hours | Eight Hours | Sixteen Hours |
| Tertiary-octyl-beta-naphthol | White | White | White | Cream. |
| Tertiary-butyl-beta-naphthol | do | do | do | Do. |
| Di-tertiary-butyl-beta-naphthol | do | do | do | Do. |
| Control | Light tan | Light brown | Tan | Dark tan. |

The exposure tests showed that each of these alkylated napthols is better than stabilizer No. 1.

Tapered dumbbell samples from slabs of the same GR-S stocks cured 50 minutes at 300° F. were stretched 12½ per cent on racks and subjected to natural weathering. The following table records the extent of discoloration on the front and back of the same test strips after such weathering for different periods of time.

TABLE IV

*Natural weathering of GR-S vulcanizate*

| Antioxidant | Eight Days | | One Month | | Two Months | |
|---|---|---|---|---|---|---|
| | Front | Back | Front | Back | Front | Back |
| Tertiary-octyl-beta-naphthol. | White | White | White | White | White | White. |
| Tertiary-butyl-beta-naphthol. | ___do___ | ___do___ | ___do___ | ___do___ | ___do___ | Do. |
| Di-tertiary-butyl-beta-naphthol. | ___do___ | ___do___ | ___do___ | ___do___ | ___do___ | Do. |
| Control Stabilizer No. 1 | Dark cream | Dark cream | Light tan | Tan | Tan | Dark tan. |

In the weathering tests as above recorded the alkylated naphthols are all shown to be superior to stabilizer No. 1.

In another weathering test samples were prepared from GR-S containing 2 per cent of beta naphthol and 2 per cent of tertiary-octyl-beta-naphthol, compounded according to the preceding formula. These samples were subjected to natural aging in Ohio, commencing in May, to compare the discoloring effect of beta-naphthol and tertiary-octyl-beta-naphthol. The results of the test are recorded in the following table:

TABLE V

*Discoloration of GR-S vulcanizate during natural weathering*

| Added Material | After One Month's Exposure | After Two Months' Exposure |
|---|---|---|
| Tertiary-octyl-beta-naphthol. | White | White. |
| Beta-naphthol | Very light cream | Very light cream. |

The above results show that the substituted beta-naphthol does not discolor, but unsubstituted beta-naphthol does discolor.

The invention includes the stabilization of any rubber-like copolymer of a conjugated diene—for example, butadiene, isoprene, 2-cyanobutadiene, pentadiene, piperylene, dimethyl-butadiene, etc.—with a vinyl aromatic compound—for example, styrene, alpha-methylstyrene, nuclear-substituted styrenes, monochlorostyrene, dichlorostyrene, vinylnaphthalene, vinylbiphenyl, vinylcarbazole, etc.

The invention is not limited to the details disclosed. In general, the stabilizer will be used in amounts varying from about 0.1 per cent to 10 per cent. The stabilizing effect is not dependent upon the presence of titanium oxide or any other compounding ingredient of the above formula other than the antioxidant employed. The invention is defined in the appended claims.

This application is a continuation-in-part of my prior application Serial No. 655,886, filed March 20, 1946, now abandoned.

What I claim is:

1. Rubber-like copolymer of a conjugated diene monomer and a vinyl aromatic monomer stabilized with a tertiary-alkyl-beta-naphthol in which the alkyl group contains 4 to 10 carbon atoms.

2. Uncured rubber-like copolymer of butadiene and styrene stabilized with a tertiary-alkyl-beta-naphthol in which the alkyl group contains 4 to 10 carbon atoms.

3. Latex of uncured rubber-like copolymer of butadiene and styrene stabilized with a tertiary-alkyl-beta-naphthol in which the alkyl group contains 4 to 10 carbon atoms.

4. Uncured coagulum of rubber-like copolymer of butadiene and styrene obtained from a latex thereof, stabilized with a tertiary-alkyl-beta-naphthol in which the alkyl group contains 4 to 10 carbon atoms.

5. A composition of uncured, rubber-like copolymer of butadiene and styrene admixed with compounding ingredients including as a stabilizer a tertiary-alkyl-beta-naphthol in which the alkyl group contains 4 to 10 carbon atoms.

6. Cured rubber-like copolymer of butadiene and styrene stabilized with a tertiary-alkyl-beta-naphthol in which the alkyl group contains 4 to 10 carbon atoms.

7. A cured rubber-like copolymer of butadiene and styrene pigmented with white pigment so as to be light in color and stabilized with a tertiary-alkyl-beta-naphthol in which the alkyl group contains 4 to 10 carbon atoms.

8. The process of treating a rubber-like copolymer of a conjugated diene monomer and a vinyl aromatic monomer which comprises incorporating therewith as a stabilizer a tertiary-alkyl-beta-naphthol in which the alkyl group contains 4 to 10 carbon atoms, and heating to a temperature of at least 75° C. for a period in which substantial oxidation would occur in the absence of the stabilizer.

9. The process of drying coagulum of uncured rubber-like copolymer of butadiene and styrene obtained from a latex thereof, which comprises drying the same in the presence of a tertiary-alkyl-beta-naphthol in which the alkyl group contains 4 to 10 carbon atoms, whereby drying is effected without dark discoloration of the copolymer.

10. The process of curing rubber-like copolymer of butadiene and styrene which comprises mixing the same with compounding ingredients including sulfur, white pigment so as to make the vulcanizate light in color, and as a stabilizer a tertiary-alkyl-beta-naphthol in which the alkyl group contains 4 to 10 carbon atoms, and then heating whereby the copolymer is cured without dark discoloration thereof.

11. Rubber-like copolymer of butadiene and styrene stabilized with tertiary-octyl-beta-naphthol.

12. Rubber-like copolymer of butadiene and styrene stabilized with tertiary-butyl-beta-naphthol.

13. Rubber-like copolymer of butadiene and styrene stabilized with di-tertiary-butyl-beta-naphthol.

14. The process of curing rubber-like copolymer of butadiene and styrene which comprises mixing the same with compounding ingredients including sulfur and tertiary-octyl-beta-naphthol as a stabilizer and then heating to cure.

15. The process of curing rubber-like copolymer of butadiene and styrene which comprises mixing the same with compounding ingredients including sulfur and tertiary-butyl-beta-naphthol as a stabilizer and then heating to cure.

16. The process of curing rubber-like copolymer of butadiene and styrene which comprises mixing the same with compounding ingredients including sulfur and di-tertiary-butyl-beta-naphthol as a stabilizer and then heating to cure.

HARRY E. ALBERT.

REFERENCES CITED

The following references are of record in the file of this patent:

UNITED STATES PATENTS

| Number | Name | Date |
|---|---|---|
| 1,947,458 | Calcott et al. | Feb. 20, 1934 |
| 2,181,823 | Stevens et al. | Nov. 28, 1939 |
| 2,300,607 | Zaucker | Nov. 3, 1942 |

FOREIGN PATENTS

| Number | Country | Date |
|---|---|---|
| 27,978 | Australia | May 21, 1931 |